United States Patent
Garcia Delgado et al.

(10) Patent No.: US 12,475,239 B2
(45) Date of Patent: Nov. 18, 2025

(54) SAFETY-MEASURE CENTRIC TEMPORAL CONTAINERS FOR REAL-TIME CREATION DURING A DIGITAL MEETING

(71) Applicant: INTERNATIONAL BUSINESS MACHINES CORPORATION, Armonk, NY (US)

(72) Inventors: Carolina Garcia Delgado, Zapopan (MX); Al Chakra, Apex, NC (US); Jonathan Cottrell, Canandaigua, NY (US)

(73) Assignee: International Business Machines Corporation, Armonk, NY (US)

( * ) Notice: Subject to any disclaimer, the term of this patent is extended or adjusted under 35 U.S.C. 154(b) by 365 days.

(21) Appl. No.: 17/662,510

(22) Filed: May 9, 2022

(65) Prior Publication Data
US 2023/0359751 A1   Nov. 9, 2023

(51) Int. Cl.
*H04L 65/403* (2022.01)
*G06F 21/62* (2013.01)
*H04L 65/1073* (2022.01)

(52) U.S. Cl.
CPC ...... *G06F 21/6209* (2013.01); *H04L 65/1073* (2013.01); *H04L 65/403* (2013.01); *G06F 2221/2111* (2013.01)

(58) Field of Classification Search
CPC ......... G06F 21/6209; G06F 2221/2111; H04L 65/1073; H04L 65/403; H04L 12/1822; H04L 12/1845; H04L 12/1831
See application file for complete search history.

(56) References Cited

U.S. PATENT DOCUMENTS

| 7,685,577 B2 | 3/2010 | Pace |
| 9,356,977 B2 | 5/2016 | Christiansen |

(Continued)

FOREIGN PATENT DOCUMENTS

| CN | 108390998 A | 8/2018 | |
| EP | 3742369 A1 * | 11/2020 | ........... G06Q 10/103 |
| WO | WO-2021126273 A1 * | 6/2021 | |

OTHER PUBLICATIONS

Author Unknown, "25 Biggest GDPR Fines So Far (2019, 2020, 2021, 2022)," Tessian, Jan. 27, 2022, https://www.tessian.com/blog/biggest-gdpr-fines-2020/, 10 pages.

(Continued)

*Primary Examiner* — Lynn D Feild
*Assistant Examiner* — Abdullah Almamun
(74) *Attorney, Agent, or Firm* — Michael O'Keefe (57) ABSTRACT

According to one embodiment, a method, computer system, and computer program product for temporal container generation is provided. The embodiment may include identifying a geolocation associated with a user device for each user within a web conference. The embodiment may also include generating a temporal container for each identified geolocation on one or more commonly controlled servers. The embodiment may further include assigning a temporal container corresponding to the geolocation associated with the user device to each user. The embodiment may also include, in response to a user within the web conference sharing a document, storing the document to each temporal container. The embodiment may further include granting each user permission to access the shared document in the temporal container to which each user is assigned.

17 Claims, 8 Drawing Sheets

(56) References Cited

U.S. PATENT DOCUMENTS

| | | | |
|---|---|---|---|
| 9,361,468 B2 | 6/2016 | Peddada | |
| 9,501,507 B1* | 11/2016 | Harris | G06F 16/2255 |
| 10,091,253 B2 | 10/2018 | Sedar | |
| 10,257,291 B1 | 4/2019 | Matiash | |
| 10,320,861 B2 | 6/2019 | Caston | |
| 10,868,684 B2 | 12/2020 | Jaber | |
| 10,929,459 B2* | 2/2021 | Jones | H04W 4/029 |
| 10,931,616 B1* | 2/2021 | Ewing | H04L 51/58 |
| 10,999,355 B1* | 5/2021 | Chu | H04L 63/107 |
| 11,019,064 B2* | 5/2021 | Rudden | H04L 63/102 |
| 11,159,429 B2* | 10/2021 | Yin | H04L 41/0816 |
| 2010/0036943 A1* | 2/2010 | Hosokawa | G06F 13/00 709/224 |
| 2012/0290954 A1 | 11/2012 | Qureshi | |
| 2013/0047267 A1* | 2/2013 | Lipscomb | G06F 21/105 726/28 |
| 2013/0263020 A1* | 10/2013 | Heiferman | H04L 12/1818 715/753 |
| 2013/0283193 A1* | 10/2013 | Griffin | G06F 3/1446 715/761 |
| 2014/0207511 A1 | 7/2014 | Klausmeier | |
| 2014/0297629 A1* | 10/2014 | Lin | G06F 16/78 707/724 |
| 2015/0242514 A1* | 8/2015 | Simon | G06Q 50/01 707/740 |
| 2016/0021200 A1* | 1/2016 | Oh | H04L 67/535 455/416 |
| 2016/0044728 A1* | 2/2016 | Hong | H04W 72/04 370/329 |
| 2016/0156628 A1 | 6/2016 | Nukala | |
| 2016/0266864 A1* | 9/2016 | Rajendran | H04L 12/1822 |
| 2018/0109501 A1* | 4/2018 | Pawgi | H04L 63/0428 |
| 2018/0183810 A1* | 6/2018 | Jones | H04L 9/3234 |
| 2018/0336351 A1* | 11/2018 | Jeffries | G06F 21/53 |
| 2019/0253430 A1 | 8/2019 | Gamache | |
| 2020/0366509 A1* | 11/2020 | Jung | H04W 4/21 |
| 2021/0042796 A1* | 2/2021 | Khoury | G06Q 30/0272 |
| 2021/0124603 A1* | 4/2021 | Rafey | G06N 20/00 |
| 2022/0083212 A1* | 3/2022 | Negulescu | G06Q 10/1097 |
| 2022/0239655 A1* | 7/2022 | Viswanathan | H04L 63/105 |
| 2023/0055101 A1* | 2/2023 | Reed | H04L 9/3213 |

OTHER PUBLICATIONS

Mell et al., "The NIST Definition of Cloud Computing", National Institute of Standards and Technology, Special Publication 800-145, Sep. 2011, 7 pages.

Microsoft, "Limit sharing in Microsoft 365," Microsoft 365, Feb. 23, 2022, https://docs.microsoft.com/en-us/microsoft-365/solutions/microsoft-365-limit-sharing?view=o365-worldwide, 11 pages.

Ray et al., "A Spatio-Temporal Role-Based Access Control Model," ResearchGate, Conference Paper, Aug. 2007, https://www.researchgate.net/publication/225690196_A_Spatio-temporal_Role-Based_Access_Control_Model, 17 pages.

Wikipedia, "General Data Protection Regulation," Wikipedia The Free Encyclopedia, Accessed: Mar. 3, 2022, https://en.wikipedia.org/wiki/General_Data_Protection_Regulation, 29 pages.

"Patent Cooperation Treaty PCT International Search Report", International Application No. PCT/EP2023/061104, International Filing Date: Apr. 27, 2023, Date of Mailing: Jul. 12, 2023, 9 pages.

Sunnyvale Calif, "Proofpoint Closes Acquisition of Tessian", Proofpoint, Dec. 19, 2023, 06 pages, https://www.proofpoint.com/us/newsroom/press-releases/proofpoint-closes-acquisition-tessian.

* cited by examiner

| User | Spatial Device | Country (IP) | Temporal Container |
|---|---|---|---|
| User A | ▯ | Croatia | 1 |
| User B | ▫ | Italy | 2 |
| User C | ▯ | France | 3 |
| User D | ▯ | Italy | 2 |
| User E | ▫ | Italy | 2 |
| User F | ▯ | Spain | 4 |
| User G | ▯ | Spain | 4 |
| User H | ▯ | Italy | 2 |

SAFETY-MEASURE CENTRIC TEMPORAL CONTAINERS FOR REAL-TIME CREATION DURING A DIGITAL MEETING

BACKGROUND

The present invention relates generally to the field of computing, and more particularly to web conferencing.

Web conferencing, including but not limited to audio conferencing and video conferencing, may relate to any communication between two or more individuals over a network, such as the Internet, where the participating members utilize audio and/or video streams. Web conferencing allows for a dynamic interface between users in separate locations to efficiently communicate as if they were in person by allowing face-to-face interactions and the sharing of files between participating users. Popular web conferencing applications include Zoom® (Zoom and all Zoom-based trademarks and logos are trademarks or registered trademarks of Zoom Video Communications Inc. and/or its affiliates), Webex® (Webex and all Webex-based trademarks and logos are trademarks or registered trademarks of Webex Communications, Inc. and/or its affiliates), GoToMeeting® (GoToMeeting and all GoToMeeting-based trademarks and logos are trademarks or registered trademarks of Citrix Online, LLC. and/or its affiliates), and FaceTime® (Facetime and all Facetime-based trademarks and logos are trademarks or registered trademarks of Apple Inc. and/or its affiliates) among others.

SUMMARY

According to one embodiment, a method, computer system, and computer program product for temporal container generation is provided. The embodiment may include identifying a geolocation associated with a user device for each user within a web conference. The embodiment may also include generating a temporal container for each identified geolocation on one or more commonly controlled servers. The embodiment may further include assigning a temporal container corresponding to the geolocation associated with the user device to each user. The embodiment may also include, in response to a user within the web conference sharing a document, storing the document to each temporal container. The embodiment may further include granting each user permission to access the shared document in the temporal container to which each user is assigned.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. In the description, details of well-known features and techniques may be omitted to avoid unnecessarily obscuring the presented embodiments.

It is to be understood that the singular forms "a," "an," and "the" include plural referents unless the context clearly dictates otherwise. Thus, for example, reference to "a component surface" includes reference to one or more of such surfaces unless the context clearly dictates otherwise.

Embodiments of the present invention relate to the field of computing, and more particularly to web conferencing. The following described exemplary embodiments provide a system, method, and program product to, among other things, transmitting files shared during a web conference through temporal containers. Therefore, the present embodiment has the capacity to improve the technical field of web conferencing by ensuring country-specific data privacy laws are adhered to during the transmission of possibly sensitive data in a web conference that may otherwise be inadvertently run afoul through standard data transmission methods.

As previously described, video conferencing, or web conferencing, may relate to any communication between two or more individuals over a network, such as the Internet, where the participating members utilize audio and/or video streams. Web conferencing allows for a dynamic interface between users in separate locations to efficiently communicate as if they were in person by allowing face-to-face interactions and the sharing of files between participating users. Popular web conferencing applications include Zoom® (Zoom and all Zoom-based trademarks and logos are trademarks or registered trademarks of Zoom Video Communications Inc. and/or its affiliates), Webex® (Webex and all Webex-based trademarks and logos are trademarks or registered trademarks of Webex Communications, Inc. and/or its affiliates), GoToMeeting® (GoToMeeting and all GoToMeeting-based trademarks and logos are trademarks or registered trademarks of Citrix Online, LLC. and/or its affiliates), and FaceTime® (Facetime and all Facetime-based trademarks and logos are trademarks or registered trademarks of Apple Inc. and/or its affiliates) among others.

During online meetings or chat sessions, information may be exchanged rapidly to make timely decisions or choices. Some transmitted data shared during a web conference may be originally stored in various high security systems accessible to only a subset of users attending a meeting. For example, in a web conference between five individuals, only three may have access to data being shared to the group. Although viewing of the transmitted data may be permitted under certain circumstances, retention of the shared file may compromise any personal, identifiable, and/or sensitive data contained within. As such, it may be advantageous to, among other things, properly secure any data transmitted within a web conference to the meeting participants within one or more temporal containers that can be automatically deleted or otherwise destroyed at the conclusion of the meeting.

According to at least one embodiment, files shared during a web conference may be shared within one or more temporal data containers. Each meeting participant may be placed into a different temporal container based on each attendee's role, age, system access level, data access level, location, or other preconfigured characteristics. The temporal containers may be created on-demand as needed based on the sharing meeting participant's authorization to the data being shared. In at least one embodiment, the created temporal containers may be country-specific so that data does not cross country borders in order to adhere to data privacy frameworks of general data protection regulations (GDPR).

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The following described exemplary embodiments provide a system, method, and program product to generate temporal containers for data shared between web conference attendees that allows for data privacy protection of the shared data.

Figure 1:
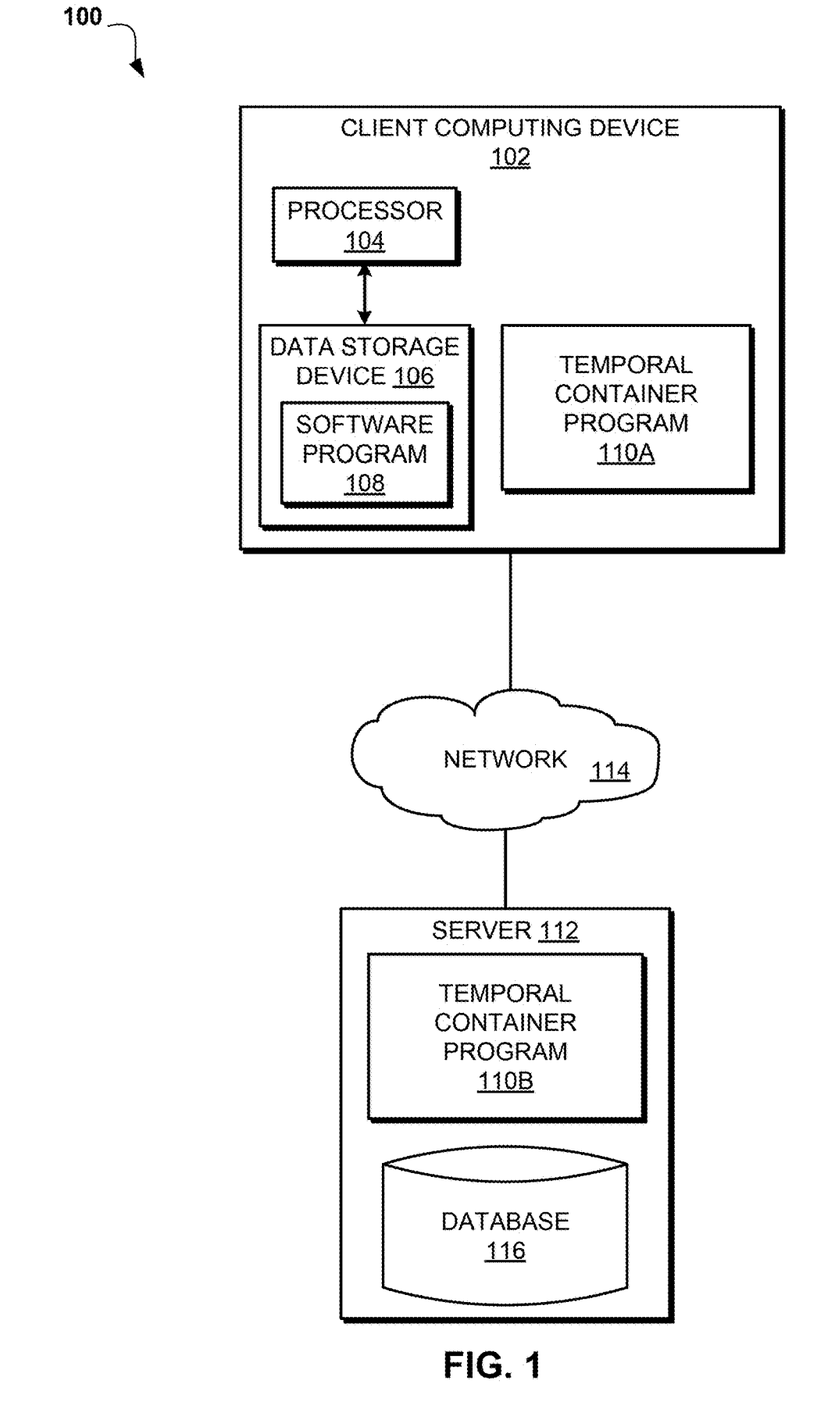
FIG. 1 illustrates an exemplary networked computer environment according to at least one embodiment.

Referring to FIG. 1, an exemplary networked computer environment 100 is depicted, according to at least one embodiment. The networked computer environment 100 may include client computing device 102 and a server 112 interconnected via a communication network 114. According to at least one implementation, the networked computer environment 100 may include a plurality of client computing devices 102 and servers 112, of which only one of each is shown for illustrative brevity. Additionally, in one or more embodiments, the client computing device 102 and server 112 may each individually host a temporal container program 110A, 110B. In one or more other embodiments, the temporal container program 110A, 110B may be partially hosted on both the client computing device 102 and the server 112 so that functionality may be separated between the devices.

The communication network 114 may include various types of communication networks, such as a wide area network (WAN), local area network (LAN), a telecommunication network, a wireless network, a public switched network and/or a satellite network. The communication network 114 may include connections, such as wire, wireless communication links, or fiber optic cables. It may be appreciated that FIG. 1 provides only an illustration of one implementation and does not imply any limitations with regard to the environments in which different embodiments may be implemented. Many modifications to the depicted environments may be made based on design and implementation requirements.

Client computing device 102 may include a processor 104 and a data storage device 106 that is enabled to host and run a software program 108 and the temporal container program 110A and communicate with the server 112 via the communication network 114, in accordance with one embodiment of the invention. In one or more other embodiments, client computing device 102 may be, for example, a mobile device, a telephone, a personal digital assistant, a netbook, a laptop computer, a tablet computer, a desktop computer, or any type of computing device capable of running a program and accessing a network. As previously described, one client computing device 102 is depicted in FIG. 1 for illustrative purposes, however, any number of client computing devices 102 may be utilized. As will be discussed with reference to FIG. 4, the client computing device 102 may include internal components 402a and external components 404a, respectively.

The server computer 112 may be a laptop computer, netbook computer, personal computer (PC), a desktop computer, or any programmable electronic device or any network of programmable electronic devices capable of hosting and running the temporal container program 110B and a database 116 and communicating with the client computing device 102 via the communication network 114, in accordance with embodiments of the invention. As will be discussed with reference to FIG. 4, the server computer 112 may include internal components 402b and external components 404b, respectively. The server 112 may also operate in a cloud computing service model, such as Software as a Service (SaaS), Platform as a Service (PaaS), or Infrastructure as a Service (IaaS). The server 112 may also be located in a cloud computing deployment model, such as a private cloud, community cloud, public cloud, or hybrid cloud.

According to the present embodiment, the temporal container program 110A, 110B may be capable of receiving various items of user information when a user enters a web conference and, using the user information, grouping each web conference participant into a temporal container for purposes of data and document sharing to ensure data privacy laws are adhered to and sensitive and personal information is protected during and at the conclusion of the web conference. The temporal container method is explained in further detail below with respect to FIG. 2.

Figure 2:
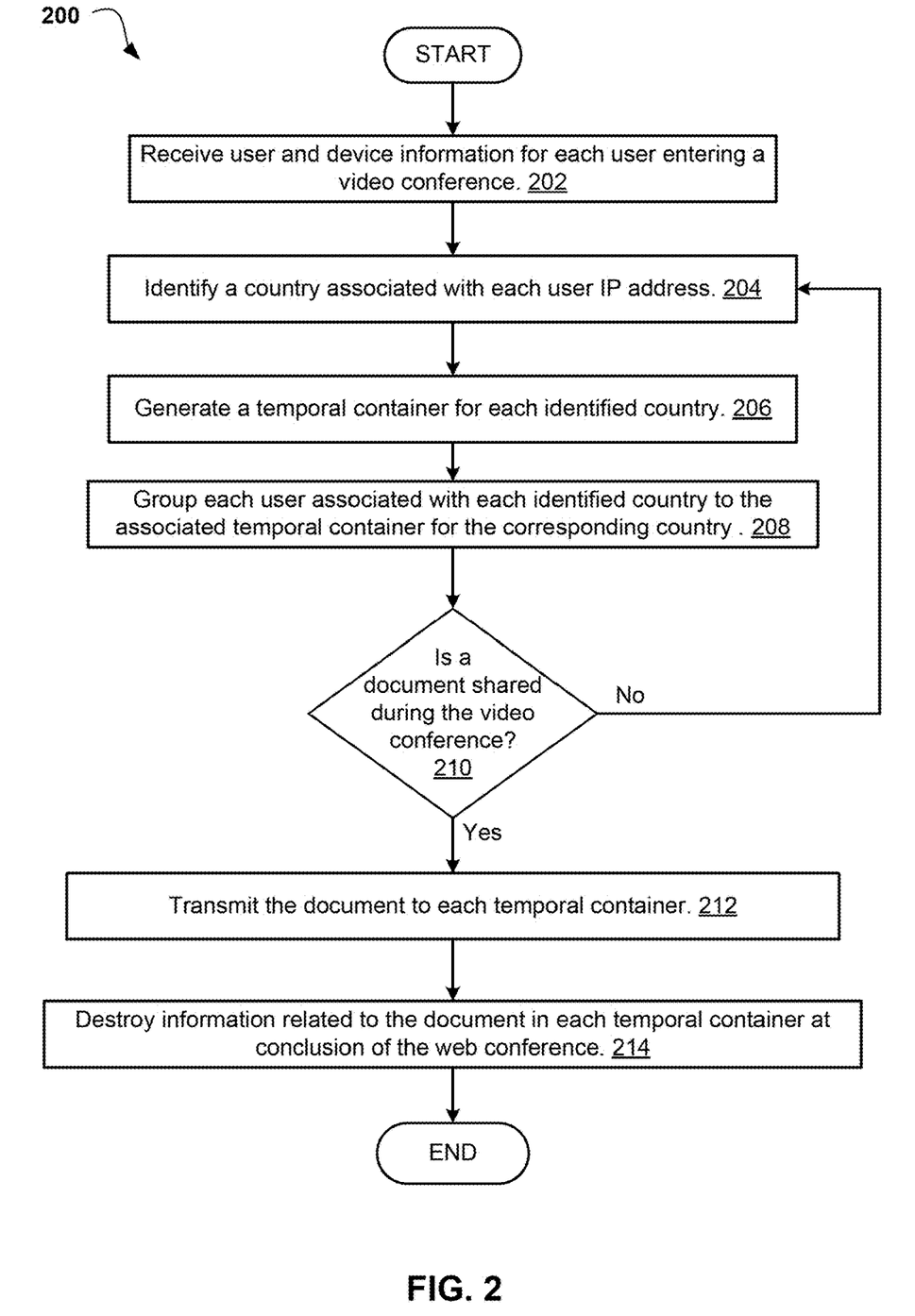
FIG. 2 illustrates an operational flowchart for a temporal container generation process according to at least one embodiment.

Referring now to FIG. 2, an operational flowchart illustrating a temporal container process 200 is depicted according to at least one embodiment. At 202, the temporal container program 110A, 110B receives user and device information for each user entering a video conference. Upon a user joining a web conference, the temporal container program 110A, 110B may query preconfigured information necessary for performance. In at least one embodiment, the temporal container program 110A, 110B may require a user to opt-in to disclosing preconfigured user and device information before entering the web conference. If a user wishes to opt-out of the disclosure of user and device information before joining the web conference or upon request to disclose after joining the web conference, the temporal container program 110A, 110B may tag the user's opt-out accordingly and limit certain features of the web conference. For example, if a user opts out, the temporal container program 110A, 110B may prevent the user from receiving or observing shared documents during the web conference since the temporal container program 110A, 110B may be unable to accurately sort the user into an appropriate temporal container as discussed in further detail below.

In at least one embodiment, user and device information received by the temporal container program 110A, 110B may include, but is not limited to, a user's role in the web conference, user age, user system access level, user data access level, user device type, user device serial number, user device manufacturer number, user device IP address, user device connection type, user device connection strength, and other unique characteristics.

Then, at 204, the temporal container program 110A, 110B identifies a country associated with each user IP address. Upon receiving opt-in authorization from each user joining the web conference, the temporal container program 110A, 110B may utilize the IP address associated with each user device to identify a country corresponding to the device's current location. For example, in a meeting with eight participants, the temporal container program 110A, 110B may utilize the IP address of each user device to determine that four of the participants are located in Italy, two participants are located in Spain, one participant is located in Croatia, and one participant is located in France. In at least one other embodiment, the temporal container program 110A, 110B may utilize connected user IDs, device types, web browser, open applications, installed applications, and/or operating system locales to identify the user's current country/locale.

Next, at 206, the temporal container program 110A, 110B generates one or more temporal containers based on preconfigurations. The temporal container program 110A, 110B may generate one or more temporal containers on one or more user- or entity-controlled servers in each identified country or geo-location in which to sort the web conference participants into based on preconfigured characteristics. Since each server storing the temporal containers are commonly controlled, the data within the shared document remains in custody of the user or entity that owns the information thereby ensuring compliance with data privacy laws. The number of temporal containers created may vary from one to the total number of web conference participants depending on the preconfigurations established by the web conference host, developers, or an administrator. In one or more embodiments, the preconfigurations may include, but are not limited to, user role, age, system access level, user data access level, and/or other unique user characteristics. For example, continuing the previous example with eight participants, the temporal container program 110A, 110B may generate four temporal containers if the temporal container program 110A, 110B is preconfigured to generate a temporal container for each country in which at least one web participant is located. By using each participant's country/locality for generating the temporal containers, the temporal container program 110A, 110B may ensure that data is not transmitted across country borders while being outside of the control of the owning user or entity. For example, by generating a temporal container for each country represented by a participant in a web conference, the temporal container program 110A, 110B may ensure only participants placed in the same temporal container have access to certain information thus ensuring data privacy laws are abided.

In another embodiment, the temporal container program 110A, 110B may generate a temporal container for each data access level each web conference participant possesses. For example, in a web conference with three participants where one participant is a high level executive, another is a mid-level manager, and another is entry level staff member where the high level executive and mid-level manager have access to certain sensitive information documents but the entry level staff member does not, the temporal container program 110A, 110B may generate two temporal containers based on the access level permissions.

Then, at 208, the temporal container program 110A, 110B groups each user associated with each identified country to the associated temporal container for the corresponding country. Upon the creation of the temporal container(s), the temporal container program 110A, 110B may group each participant of the web conference into the corresponding container depending on the criteria used for generation. For example, in the preceding example with eight web conference participants having a temporal container generated for each country represented (i.e., Italy, Spain, Croatia, and France), the temporal container program 110A, 110B may group the four participants located in Italy in the same temporal container, the two participants located in Spain in the same temporal container, and each participant from Croatia and France into their individual corresponding temporal containers.

Next, at 210, the temporal container program 110A, 110B determines whether a document is shared during the web conference. During the web conference, the temporal container program 110A, 110B may continually monitor an exchange between the participants to determine if documents or information is shared between the participants that may trigger a need to exchange the document or information through the generated temporal containers. For example, if one participant posts a document to a persistent group chat, the temporal container program 110A, 110B may determine the shared document should be transmitted to each temporal container. If the temporal container program 110A, 110B determines a document is shared (step 210, "Yes" branch), then the temporal container process 200 may proceed to step 212 to transmit the document to each temporal container. If the temporal container program 110A, 110B determines a document has not been shared (step 210, "No" branch), then the temporal container process 200 may return to step 204 to identify a country associated with each user IP address.

In at least one embodiment, the document or information being shared may be through an attachment to a group chat or through a screen share from one participant to the other web conference participants.

Then, at 212, the temporal container program 110A, 110B transmits the document to each temporal container. Once a document or information has been shared to the web conference, the temporal container program 110A, 110B may transmit a copy of the shared document to each temporal container generated in step 206. For example, if a document is shared as an attachment during a web conference according to the previously described example, the temporal container program 110A, 110B may transmit a copy of the shared document to each temporal container stored on one or more user- or entity-controlled servers. In at least one embodiment, the temporal container program 110A, 110B may permit access to the shared document to participants grouped within the temporal container so that not everyone has access to the data on the actual system.

The temporal container program 110A, 110B may store and share each document within each temporal container using a cloud storage platform, such as Box® (Box and all Box-based trademarks and logos are trademarks or registered trademarks of Box, Inc. and/or its affiliates). For example, when a participant in the web conference shares a document to the other meeting participants, the temporal container program 110A, 110B may transmit a copy of the shared document to each generated temporal container for sharing with each participant grouped to that corresponding temporal container.

During a screen share, the temporal container program 110A, 110B may transfer the shared data to each temporal container before the screen share initiates and is displayed to a graphical user interface for each meeting participant in order to prevent data leakage outside of each participant's geolocation. Thus, when the document is shared via a screen share, only the data that the user is authorized to see is displayed while the screen sharing is occurring. In at least one embodiment, the temporal container program 110A, 110B may utilize optical character recognition and/or image recognition technology to identify and obscure any data that cannot be isolated so that the data is not shared outside of the sharing user's geolocation in violation of any applicable data privacy laws.

Next, at 214, the temporal container program 110A, 110B destroys information related to the document in each temporal container at the conclusion of the web conference. At the conclusion of the web conference, the temporal container program 110A, 110B may destroy any and all information related to each document shared during the meeting and stored within each temporal container. In at least one embodiment, destruction of the shared documents stored within each temporal container may relate to the complete deletion of the document or information without the ability to recover the document or information through known data recovery solutions. For example, the temporal container program 110A, 110B may utilize a file shredding program that utilizes one or more shredding algorithms, such as DOD 5220.22-M, AFSSI-5020, AR 380-19, RCMP TSSIT OPS-II, HMG ISS, VSITR, GOST R 50739-95, Gutmann, Schneier, Random Data, Bit Toggle, NATO Standard, NAVSO P-5239-26, MS Cipher, WipeFile, Write Zero, VSITR, IREC (IRIG), NISPOMSUP Chapter 8 Section 8-501, and NSA Manual 130-2.

In at least one embodiment, the temporal container program 110A, 110B may be preconfigured to delete and/or destroy each temporal container at the conclusion of the web conference or when a chat session has been terminated or closed. Furthermore, if all participants that were grouped into a particular temporal container have left a web conference, the temporal container program 110A, 110B may delete and/or destroy the temporal container. For example, continuing the previous example, if both participants located in Spain leave the web conference and only the participants from Italy, Croatia, and France remain, the temporal container program 110A, 110B may deleted and/or destroy the Spain temporal container and retain the temporal containers for Italy, Croatia, and France.

In another embodiment, the temporal container program 110A, 110B may also delete and/or destroy one or more temporal containers after a preconfigured period of time has elapsed without user communication or document or information sharing. For example, if a group of participants takes a break for 15 minutes and the temporal container program 110A, 110B is configured to delete and/or destroy the temporal containers after 10 minutes without a chat conversation or document sharing occurring, the temporal container program 110A, 110B may delete and/or destroy each temporal container. In situations where one or more temporal containers were deleted and/or destroyed due to chat or document sharing inactivity, the temporal container program 110A, 110B may retain information related to the generation of the one or more deleted and/or destroyed temporal containers in order to regenerate each deleted and/or destroyed temporal container once chat and or document sharing resumes. In this manner, the temporal container program 110A, 110B may conserve bandwidth and processing power that would otherwise be consumed by maintaining unnecessary temporal containers while chat or document sharing is inactive.

Figure 3A:
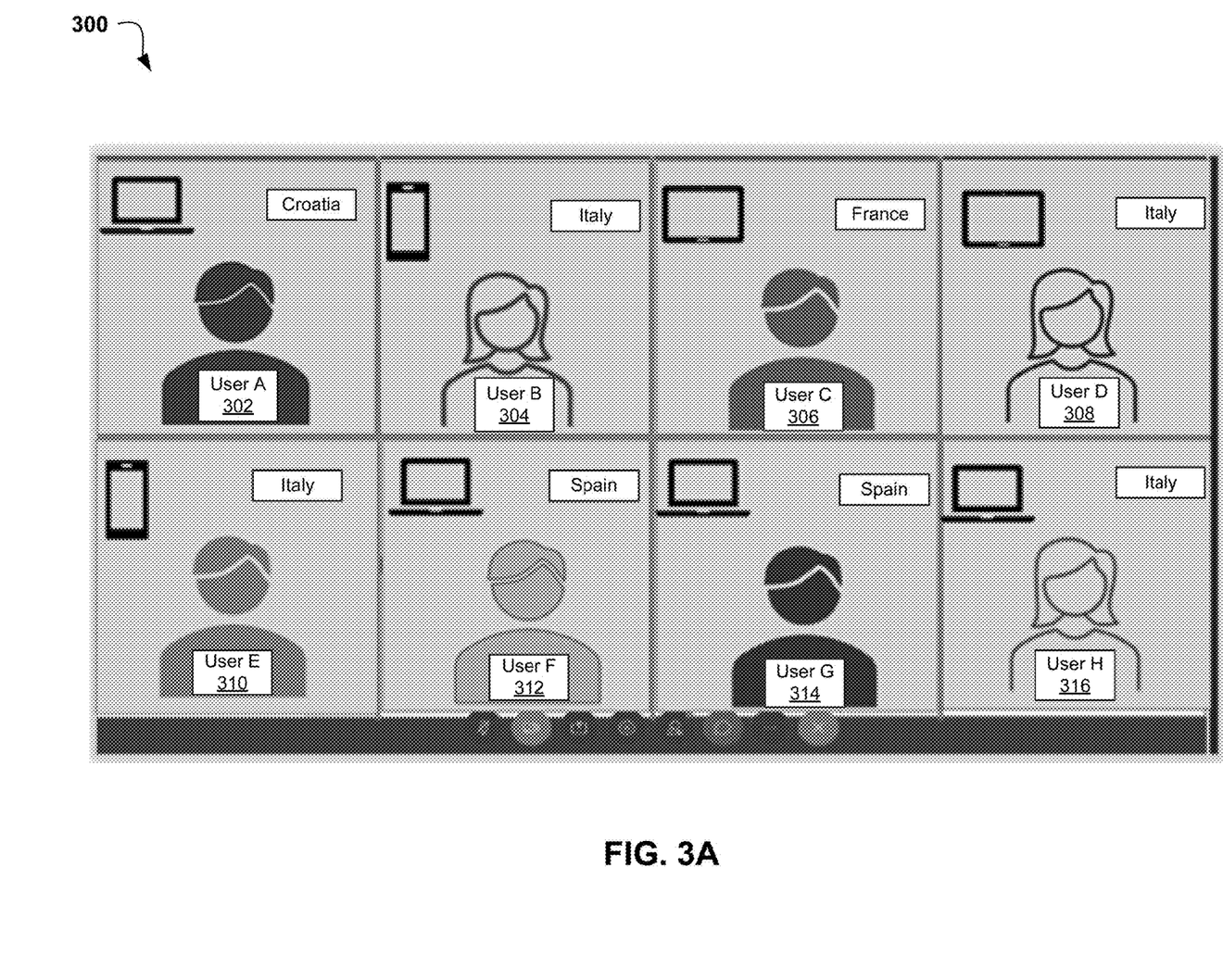
FIG. 3A is an exemplary block diagram of a video conference graphical user interface during temporal container generation according to at least one embodiment.

Referring now to FIG. 3A, an exemplary block diagram of a video conference graphical user interface during temporal container generation is depicted according to at least one embodiment. A graphical user interface 300 of a web conferencing application, such as Zoom®, Webex®, GoToMeeting®, or FaceTime®, may depict various users, such as User A 302, User B 304, User C 306, User D 308, User E 310, User F 312, User G 314, and User H 316, engaging in a web conference together. Each user 302-316 may be represented on a different section of the graphical user interface 300. In at least one embodiment, the temporal container program 110A, 110B, or the web conferencing application, may also depict or keep record of the device type and/or geolocation of each user. For example, User A 302 may be using a laptop computer within Croatia to participate in the web conference whereas User C 306 may be using a tablet within France to participate in the web conference. As previously described in step 202 above, the temporal container program 110A, 110B may receive user and device information once each user opts-in to providing such information upon joining the web conference.

Figure 3B:
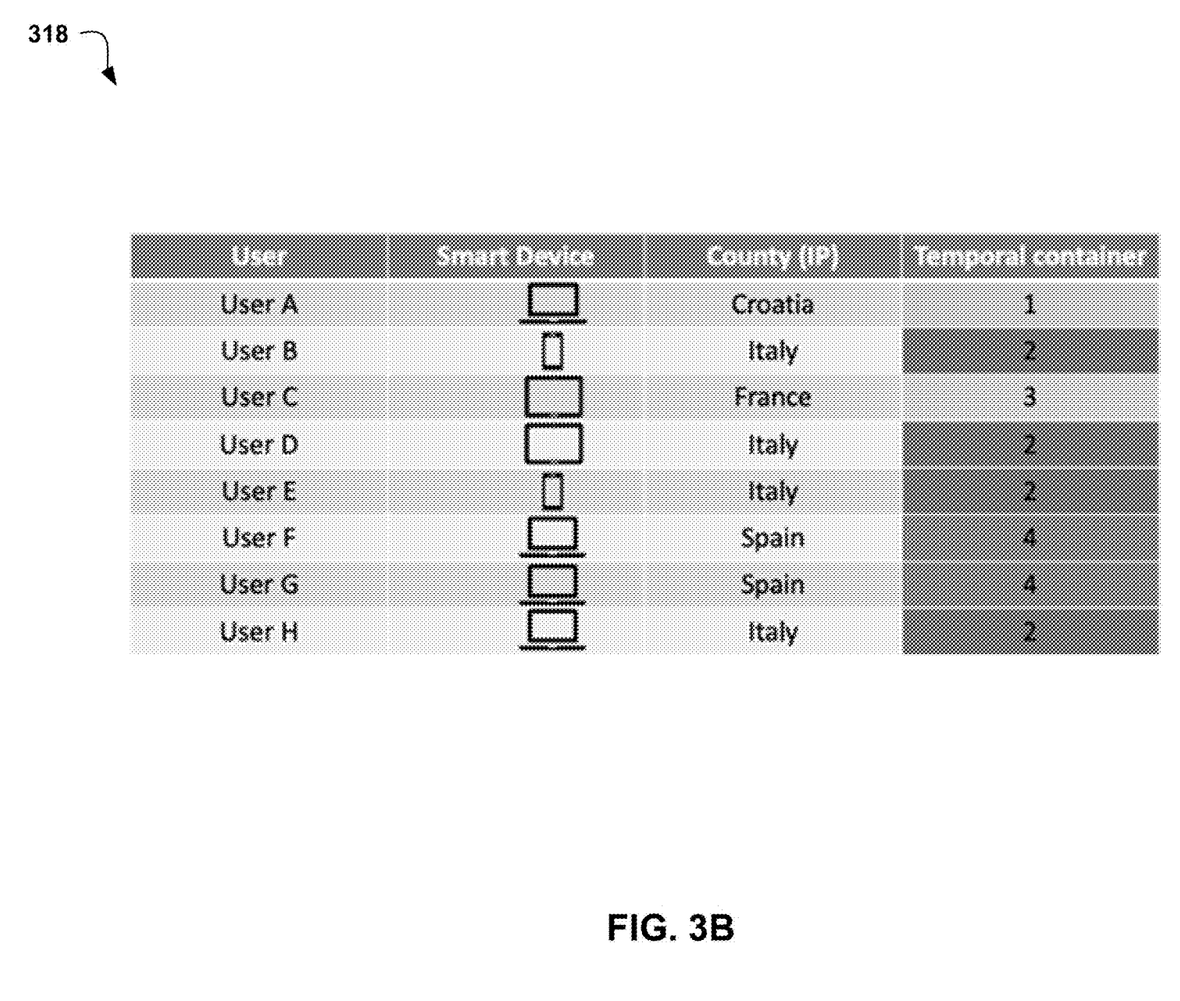
FIG. 3B is an exemplary block diagram of a participant data table created during temporal container generation according to at least one embodiment.

Referring now to FIG. 3B, an exemplary block diagram of a participant data table created during temporal container generation is depicted according to at least one embodiment. Upon receiving the user and device information from each participant, the temporal container program 110A, 110B may aggregate and sort the received user and device information in a table, such as table 318. The generated table 318 may be utilized by temporal container program 110A, 110B to determine a total number of temporal containers to generate and to which generated temporal container each participant may be sorted based on the geolocation of each participant as determined by the received user and device information. For example, the temporal container program 110A, 110B may determine that Users A-H 302-316 represent the countries of Italy, Spain, France, and Croatia based on an analysis of each user's corresponding IP address as disclosed by each user upon entering the web conference. As such, the temporal container program 110A, 110B may determine a temporal container should be generated for each identified country and assign each user to the temporal container for their corresponding country as indicated in the rightmost column of table 318 (i.e., User A 302 is located in Croatia and assigned to temporal container 1; User B 304, User D 308, User E 310, and User H 316 are located in Italy and assigned to temporal container 2; User C 306 is located in France and assigned to temporal container 3; and User F 312 and User G 314 are located in Spain and assigned to temporal container 4).

Figure 3C:
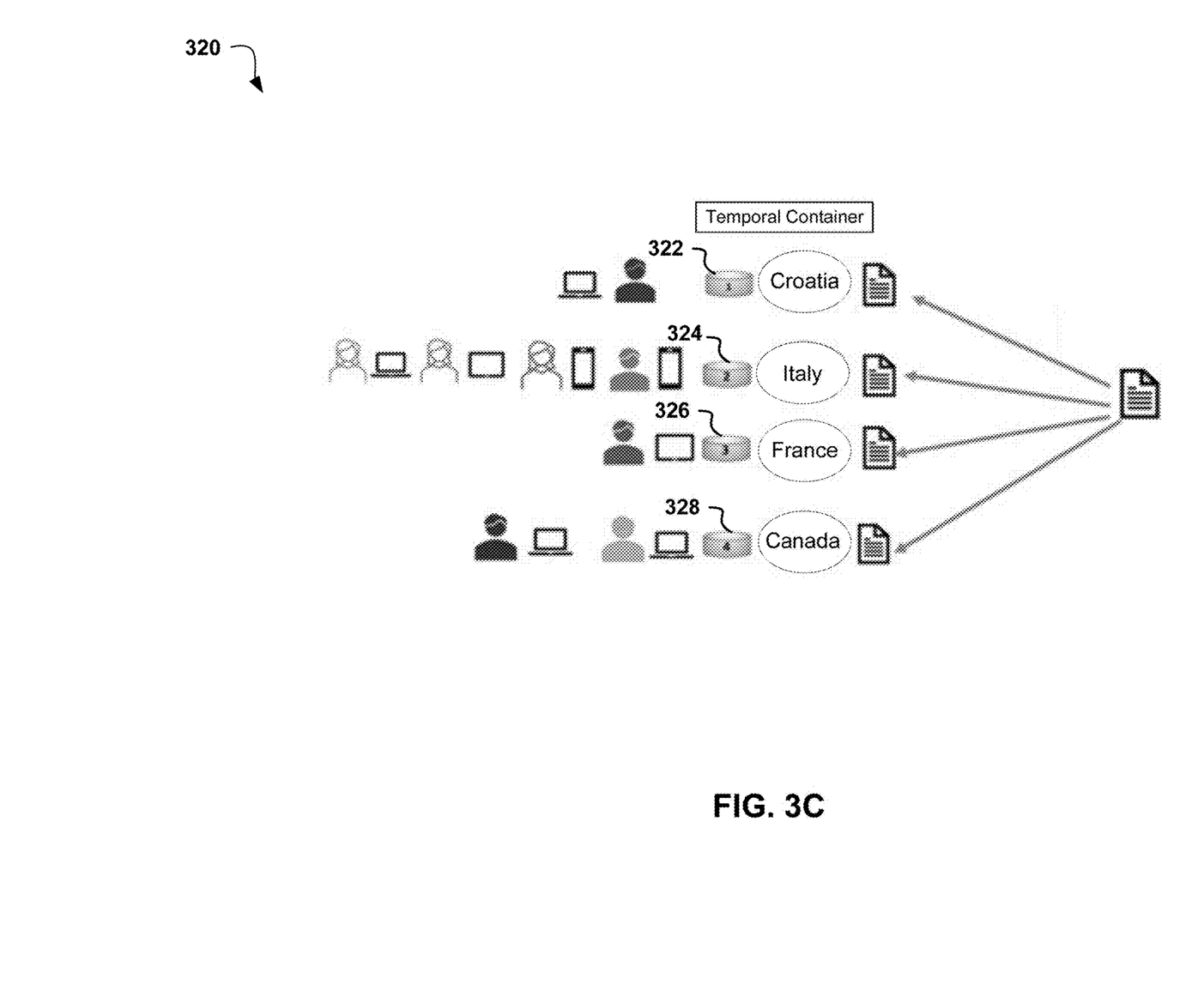
FIG. 3C is an exemplary block diagram of document sharing between generated temporal containers according to at least one embodiment.

Referring now to FIG. 3C, an exemplary block diagram of document sharing between generated temporal containers is depicted according to at least one embodiment. Once the temporal containers 322-328 are generated, the temporal container program 110A, 110B may transmit a copy of any document or information shared to the web conference to each temporal container 322-328. Each user 302-316 may only be able to view the copy of the document or information stored in the temporal container corresponding to their geolocation. For example, User A 302 may only be able to view the document stored in temporal container 1 322. Upon completion of the web conference, the temporal container program 110A, 110B may delete and/or destroy any data (e.g., the stored documents and information) within each temporal container 322-328 as well as the temporal containers 322-328 themselves.

It may be appreciated that FIGS. 2 and 3A-3C provide only an illustration of one implementation and do not imply any limitations with regard to how different embodiments may be implemented. Many modifications to the depicted environments may be made based on design and implementation requirements.

Figure 4:
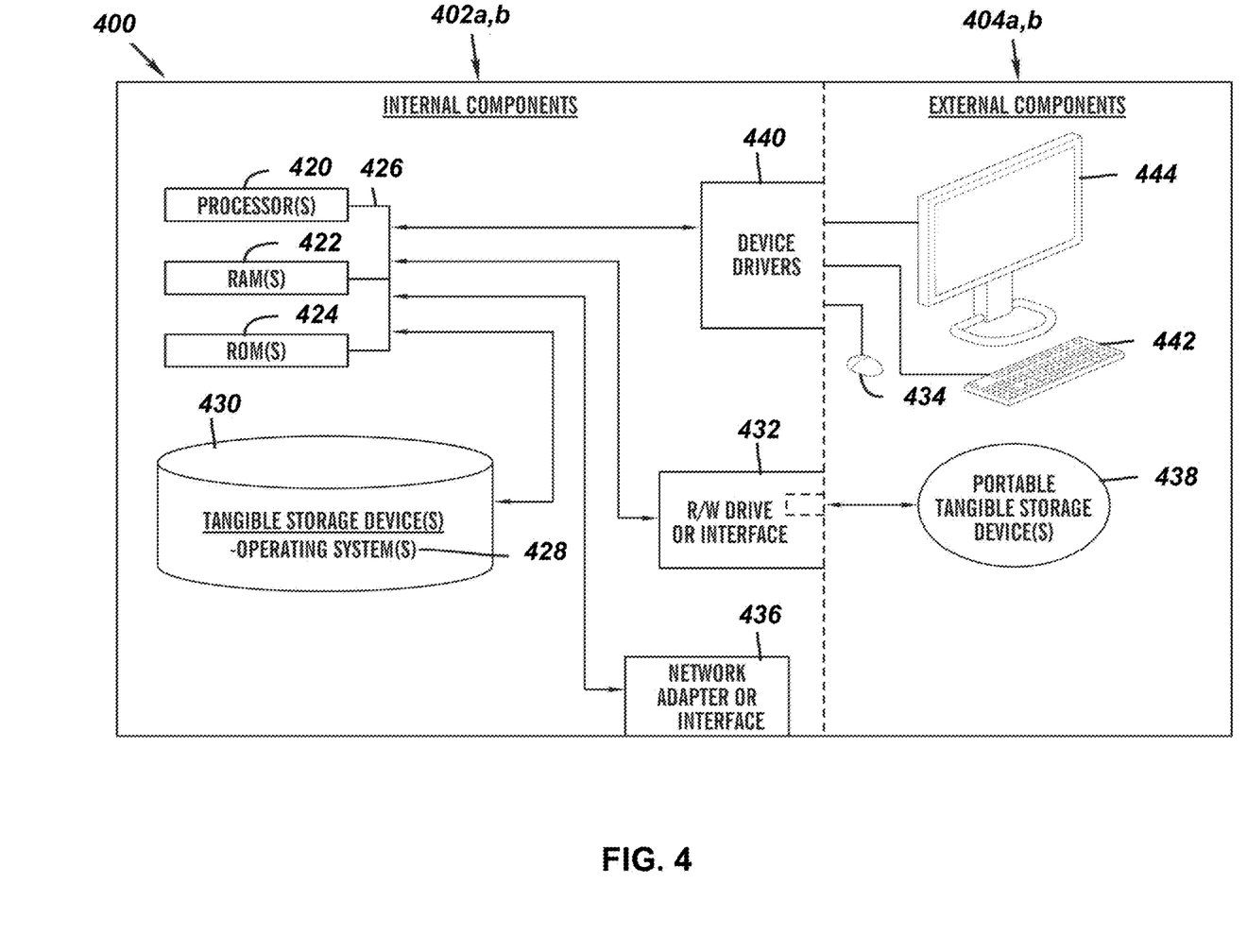
FIG. 4 is a block diagram of internal and external components of computers and servers depicted in FIG. 1 according to at least one embodiment.

FIG. 4 is a block diagram 400 of internal and external components of the client computing device 102 and the server 112 depicted in FIG. 1 in accordance with an embodiment of the present invention. It should be appreciated that FIG. 4 provides only an illustration of one implementation and does not imply any limitations with regard to the environments in which different embodiments may be implemented. Many modifications to the depicted environments may be made based on design and implementation requirements.

The data processing system 402, 404 is representative of any electronic device capable of executing machine-readable program instructions. The data processing system 402, 404 may be representative of a smart phone, a computer system, PDA, or other electronic devices. Examples of computing systems, environments, and/or configurations that may represented by the data processing system 402, 404 include, but are not limited to, personal computer systems, server computer systems, thin clients, thick clients, handheld or laptop devices, multiprocessor systems, microprocessor-based systems, network PCs, minicomputer systems, and distributed cloud computing environments that include any of the above systems or devices.

The client computing device 102 and the server 112 may include respective sets of internal components 402 a,b and external components 404 a,b illustrated in FIG. 4. Each of the sets of internal components 402 include one or more processors 420, one or more computer-readable RAMs 422, and one or more computer-readable ROMs 424 on one or more buses 426, and one or more operating systems 428 and one or more computer-readable tangible storage devices 430. The one or more operating systems 428, the software program 108 and the temporal container program 110A in the client computing device 102 and the temporal container program 110B in the server 112 are stored on one or more of the respective computer-readable tangible storage devices 430 for execution by one or more of the respective processors 420 via one or more of the respective RAMs 422 (which typically include cache memory). In the embodiment illustrated in FIG. 4, each of the computer-readable tangible storage devices 430 is a magnetic disk storage device of an internal hard drive. Alternatively, each of the computer-readable tangible storage devices 430 is a semiconductor storage device such as ROM 424, EPROM, flash memory or any other computer-readable tangible storage device that can store a computer program and digital information.

Each set of internal components 402 a,b also includes a RAY drive or interface 432 to read from and write to one or more portable computer-readable tangible storage devices 438 such as a CD-ROM, DVD, memory stick, magnetic tape, magnetic disk, optical disk or semiconductor storage device. A software program, such as the temporal container program 110A, 110B, can be stored on one or more of the respective portable computer-readable tangible storage devices 438, read via the respective R/W drive or interface 432, and loaded into the respective hard drive 430.

Each set of internal components 402 a,b also includes network adapters or interfaces 436 such as a TCP/IP adapter cards, wireless Wi-Fi interface cards, or 3G, 4G, or 5G wireless interface cards or other wired or wireless communication links. The software program 108 and the temporal container program 110A in the client computing device 102 and the temporal container program 110B in the server 112 can be downloaded to the client computing device 102 and the server 112 from an external computer via a network (for example, the Internet, a local area network or other, wide area network) and respective network adapters or interfaces 436. From the network adapters or interfaces 436, the software program 108 and the temporal container program 110A in the client computing device 102 and the temporal container program 110B in the server 112 are loaded into the respective hard drive 430. The network may comprise copper wires, optical fibers, wireless transmission, routers, firewalls, switches, gateway computers and/or edge servers.

Each of the sets of external components 404 a,b can include a computer display monitor 444, a keyboard 442, and a computer mouse 434. External components 404 a,b can also include touch screens, virtual keyboards, touch pads, pointing devices, and other human interface devices. Each of the sets of internal components 402 a,b also includes device drivers 440 to interface to computer display monitor 444, keyboard 442, and computer mouse 434. The device drivers 440, R/W drive or interface 432, and network adapter or interface 436 comprise hardware and software (stored in storage device 430 and/or ROM 424).

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 5:
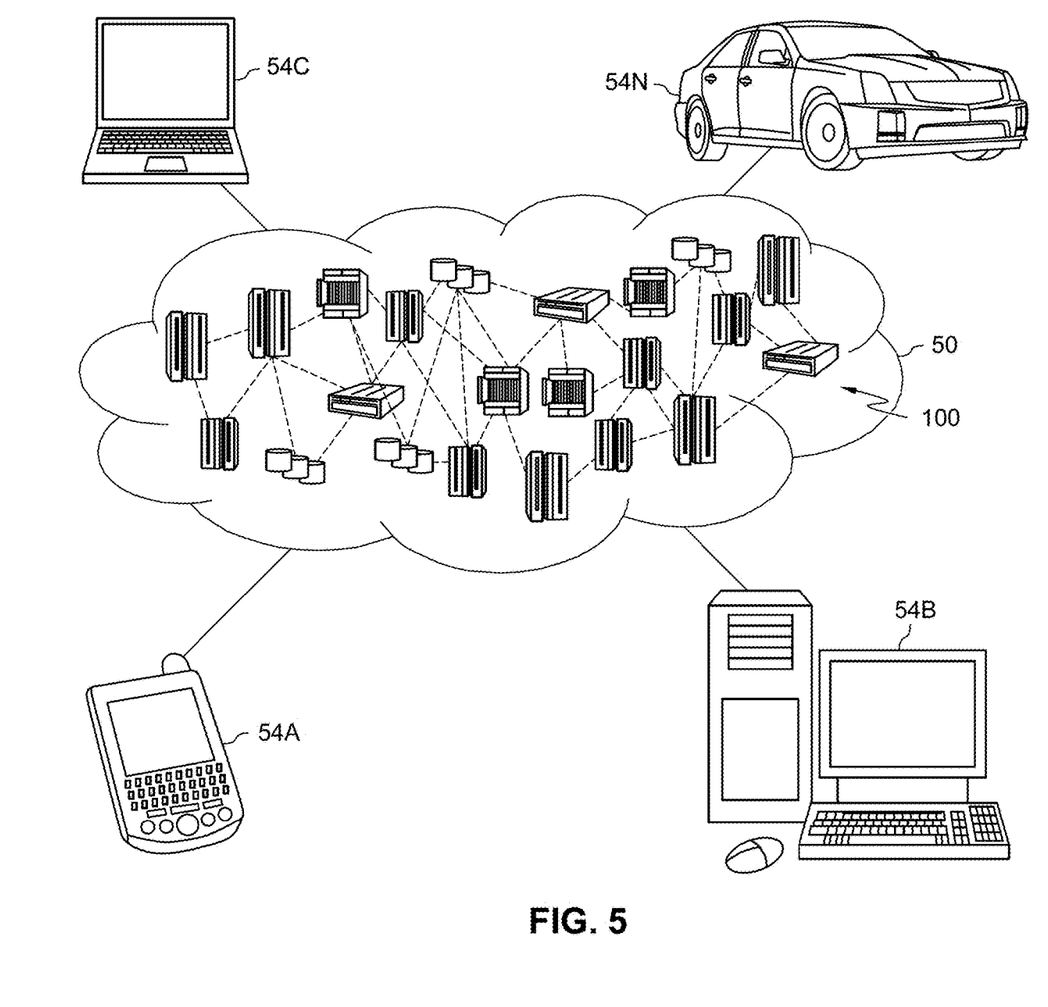
FIG. 5 depicts a cloud computing environment according to an embodiment of the present invention.

Referring now to FIG. 5, illustrative cloud computing environment 50 is depicted. As shown, cloud computing environment 50 comprises one or more cloud computing nodes 100 with which local computing devices used by cloud consumers, such as, for example, personal digital assistant (PDA) or cellular telephone 54A, desktop computer 54B, laptop computer 54C, and/or automobile computer system 54N may communicate. Nodes 100 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that computing nodes 100 and cloud computing environment 50 can communicate with any type of computerized device over any type of network and/or network addressable connection (e.g., using a web browser).

Figure 6:
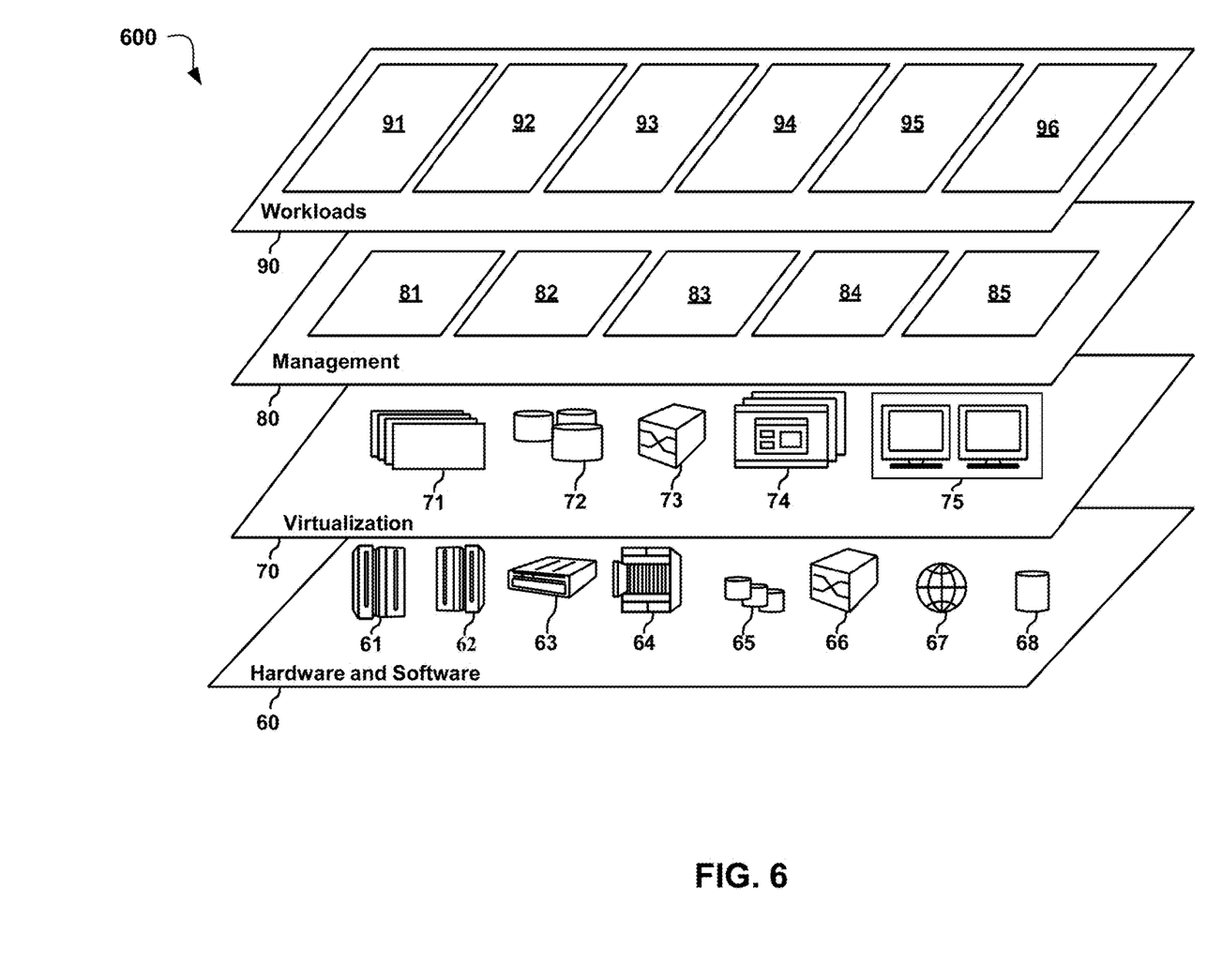
FIG. 6 depicts abstraction model layers according to an embodiment of the present invention.

Referring now to FIG. 6, a set of functional abstraction layers 600 provided by cloud computing environment 50 is shown. It should be understood in advance that the components, layers, and functions shown in FIG. 6 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and temporal container generation 96. Temporal container generation 96 may relate to receiving user and device information for each participant joining a web conference and creating a temporal container in which to group each participant based on the user and device information for purposes of protecting sensitive and personal information in adherence with country-specific data privacy laws.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A processor-implemented method, the method comprising:
   identifying, by a processor, a geolocation associated with a user device for each user within a web conference;
   generating a temporal container for each identified geolocation on one or more commonly controlled servers;
   assigning a temporal container corresponding to the geolocation associated with the user device to each user;
   in response to a user within the web conference sharing a document, storing the document to each temporal container;
   assigning or denying authorization to view the document to each temporal container based on the geolocation of the temporal container, wherein the denying comprises obscuring data in the document based on data privacy laws; and
   deleting the temporal container based on each user within the geolocation leaving the web conference, wherein the deletion comprises retaining information needed to regenerate the temporal container.

2. The method of claim 1, further comprising:
   in response to a user joining the web conference and opting in to sharing information, receiving a plurality of user information and a plurality of device information.

3. The method of claim 2, wherein the plurality of device information is selected from a group consisting of a user device type, a user device serial number, a user device manufacturer number, a user device IP address, a user device connection type, and a user device connection strength.

4. The method of claim 2, wherein the plurality of user information is selected from a group consisting of a user's role in the web conference, a user age, a user system access level, and a user data access level.

5. The method of claim 1, further comprising:
   in response to the web conference terminating, deleting the shared document from each temporal container.

6. The method of claim 1, generating the temporal container for each identified geolocation further comprises:
   generating one or more additional temporal containers within the geolocation based on a user data access level of each user with a user device IP address corresponding to the geolocation.

7. A computer system, the computer system comprising:
   one or more processors, one or more computer-readable memories, one or more computer-readable tangible storage medium, and program instructions stored on at least one of the one or more tangible storage medium for execution by at least one of the one or more processors via at least one of the one or more memories, wherein the computer system is capable of performing a method comprising:
   identifying, by a processor, a geolocation associated with a user device for each user within a web conference;
   generating a temporal container for each identified geolocation on one or more commonly controlled servers;
   assigning a temporal container corresponding to the geolocation associated with the user device to each user;
   in response to a user within the web conference sharing a document, storing the document to each temporal container;
   assigning or denying authorization to view the document to each temporal container based on the geolocation of the temporal container, wherein the denying comprises obscuring data in the document based on data privacy laws; and
   deleting the temporal container based on each user within the geolocation leaving the web conference, wherein the deletion comprises retaining information needed to regenerate the temporal container.

8. The computer system of claim 7, further comprising:
   in response to a user joining the web conference and opting in to sharing information, receiving a plurality of user information and a plurality of device information.

9. The computer system of claim 8, wherein the plurality of device information is selected from a group consisting of a user device type, a user device serial number, a user device manufacturer number, a user device IP address, a user device connection type, and a user device connection strength.

10. The computer system of claim 8, wherein the plurality of user information is selected from a group consisting of a user's role in the web conference, a user age, a user system access level, and a user data access level.

11. The computer system of claim 7, further comprising:
    in response to the web conference terminating, deleting the shared document from each temporal container.

12. The computer system of claim 7, generating the temporal container for each identified geolocation further comprises:
    generating one or more additional temporal containers within the geolocation based on a user data access level of each user with a user device IP address corresponding to the geolocation.

13. A computer program product, the computer program product comprising:
    one or more computer-readable tangible storage medium and program instructions stored on at least one of the one or more tangible storage medium, the program instructions executable by a processor capable of performing a method, the method comprising:
    identifying, by a processor, a geolocation associated with a user device for each user within a web conference;
    generating a temporal container for each identified geolocation on one or more commonly controlled servers;
    assigning a temporal container corresponding to the geolocation associated with the user device to each user;
    in response to a user within the web conference sharing a document, storing the document to each temporal container;
    assigning or denying authorization to view the document to each temporal container based on the geolocation of the temporal container, wherein the denying comprises obscuring data in the document based on data privacy laws; and
    deleting the temporal container based on each user within the geolocation leaving the web conference, wherein the deletion comprises retaining information needed to regenerate the temporal container.

14. The computer program product of claim 13, further comprising:
    in response to a user joining the web conference and opting in to sharing information, receiving a plurality of user information and a plurality of device information.

15. The computer program product of claim 14, wherein the plurality of device information is selected from a group consisting of a user device type, a user device serial number, a user device manufacturer number, a user device IP address, a user device connection type, and a user device connection strength.

16. The computer program product of claim 13, further comprising:

in response to the web conference terminating, deleting the shared document from each temporal container.

17. The computer program product of claim 13, generating the temporal container for each identified geolocation further comprises:

generating one or more additional temporal containers within the geolocation based on a user data access level of each user with a user device IP address corresponding to the geolocation.

* * * * *